United States Patent
Jordil et al.

(10) Patent No.: US 8,082,674 B2
(45) Date of Patent: Dec. 27, 2011

(54) SELF-POWERED COORDINATE PROBE

(75) Inventors: Pascal Jordil, Ecoteaux (CH); François Gabella, Buchillon (CH)

(73) Assignee: Hexagon Metrology AB, Nacka Strand (SE)

( * ) Notice: Subject to any disclaimer, the term of this patent is extended or adjusted under 35 U.S.C. 154(b) by 181 days.

(21) Appl. No.: 12/427,301

(22) Filed: Apr. 21, 2009

(65) Prior Publication Data

US 2009/0265946 A1  Oct. 29, 2009

(30) Foreign Application Priority Data

Apr. 24, 2008 (EP) .................................. 08155085

(51) Int. Cl.
*G01B 7/012* (2006.01)
*B23Q 17/22* (2006.01)
*H02K 7/18* (2006.01)
(52) U.S. Cl. .......................................... 33/558; 33/561
(58) Field of Classification Search .................. 33/556, 33/558, 559, 561
See application file for complete search history.

(56) References Cited

U.S. PATENT DOCUMENTS

| 4,716,657 | A | 1/1988 | Collingwood |
| 5,564,872 | A | 10/1996 | Veil et al. |
| 7,019,492 | B1 * | 3/2006 | Baker et al. ................. 320/114 |
| 2005/0072015 | A1 * | 4/2005 | Groell et al. ................. 33/558 |
| 2007/0006473 | A1 | 1/2007 | Schopf et al. |
| 2009/0025243 | A1 * | 1/2009 | Prestidge et al. ........... 33/559 |

FOREIGN PATENT DOCUMENTS

| EP | 1742011 A2 | 1/2007 |
| JP | 03223602 | 2/1991 |

OTHER PUBLICATIONS

European Search Report dated Aug. 14, 2008.

* cited by examiner

*Primary Examiner* — R. A. Smith
(74) *Attorney, Agent, or Firm* — Pearne & Gordon LLP

(57) ABSTRACT

A probe, connectable to a machine tool, has an electric generator and a driving element. The electric generator supplies an electric or electronic circuit with electric power, and the driving element is capable of relative rotation with respect to the stator of the electric generator. The driving element is not connected to any external energy source and can be set in rotation simply by activating the rotary axis of the machine tool. The driving element is either rotatably mounted on the probe itself or fixed on the reference table of the machine tool. The probe requires no additional connections to the machine tool on which it is mounted, besides the connection to the rotary spindle, which can be realized with a conventional tool-holder with a standardized tapered shank. The probe is fully compatible with standard probes and can be mounted and used with standard tool-holders without any adaptation.

23 Claims, 5 Drawing Sheets

SELF-POWERED COORDINATE PROBE

This application claims priority of European Patent Application EP08155085 filed on Apr. 24, 2008.

FIELD OF THE INVENTION

The present invention relates to measuring probes for use with industrial machine tools or coordinate measuring machines and specially adapted to use in computerized numerically controlled (CNC) machine tools. In particular, the present invention deals with a self-powered tool for used for measuring purposes on a workpiece.

TECHNICAL BACKGROUND

Machines that have the capability of automatically substituting different types of tools in order to perform various machining or measuring operations on a workpiece are quite widespread and well-known in the art. Modular tools are simply releasably secured to the machine, which allows dispensing with the use of specific machines for each specific operation.

Whenever such tools contain an electric circuit, power supply need to be provided to the circuit, or at least some form of releasable electrical connection between the tool support needs to be foreseen.

Modular probe heads are often mounted on a standard tool-holder, for example a Morse tapered shank, which is then releasably connected to a spindle or a rotary axis machine tool, to carry out all sorts of measurements and dimensional controls. This is often done before a working operation such as milling, boring or any other machining operation is carried out on a workpiece. Such modular probe heads are meant e.g. to ensure the proper positioning of the workpiece, or to check that its dimensions lie within an acceptable range, before starting the machining operation.

The power supply for such probe heads is often problematic, insofar as the shanks to which the probes' housings are attached usually do not contain any electrical energy source or electrical connections. When the probe is connected to a rotary axis, as it is almost invariably the case, it is then impossible to connect any electrical wire to the probe, which must be fully autonomous insofar as power supply is concerned.

Built in batteries are regularly used for supplying energy to the probe head in order to perform the measuring operations, and possibly also for transmitting information to a machine control unit. The limited lifetime of the batteries requires though their regular recharging and/or manual replacement, which is fastidious and time-consuming.

As an alternative to batteries, various systems have been proposed to solve this electric power supply problem, in converting mechanical energy into electrical energy thanks to generators.

U.S. Pat. No. 5,564,872 describes a wireless probe using a built-in hydraulic turbine fed by compressed air of fluids as an electromechanical converter. Similarly U.S. Pat. No. 4,716, 657 and US2007006473 disclose a measuring probe provided with a turbine supplied by a pressurised fluid for generating electric power.

Those solutions require hermetic ducts to carry the fluid flow, and also a precise sealing of the tool support with the probe when mounting it in order to avoid fluid leakage or pressure loss. This is not easily realized and involves a particular design of the tool-holder. In most cases the connection of the probe to the fluid circuit (e.g. a cutting fluid line) must be performed manually and separately, when it is possible at all.

Another solution for the power generation is disclosed by JP3223602, where the spindle of the machine tool drives directly an electric generator in the probe in rotation, while the housing of the probe is fixed to a non-rotating element of the machine tool's head. This requires a second mechanical connection in addition to the standard tapered shank, and thus prevents from a quick and easy change of the tools when passing from one machine operation to another.

There is hence a need for an autonomous electric power generation system for modular probe heads containing an electric circuit, free of all the limitations above.

BRIEF SUMMARY OF THE INVENTION

According to the invention, these aims are achieved by means of a touch probe and a method for power generation with the features of the independent claims. Preferred embodiments are specified in the dependent claims. In particular these aims are achieved by a coordinate probe for a machine tool, comprising: a support element, connectable to a rotary axis of the machine tool; a coordinate sensor for measuring coordinates of points on a surface of a workpiece, the coordinate sensor using an electric or electronic circuit; an electric generator, supplying said electric or electronic circuit with electric power, characterized by a driving element, at least partially free to turn about an axis relative to the stator of the electric generator said electric generator being operatively arranged to generate electric energy from the relative difference of angular speed between said driving element and said stator The proposed solution first improves the overall system efficiency in terms of power consumption. Transforming energy already produced by the machine, storing and reusing it into another form, dispenses indeed with the use of any additional energy source; furthermore, since no power autonomy problem is encountered at the machine side, the mechanical energy delivered on the probe is theoretically not bounded. The use of a flywheel as a primary energy source hence maximises the effects of the existing mechanical energy of the system in turning it into electrical power generation.

Another advantage of the disclosed solution is to provide a universal solution for a modular touch probe with an autonomous electrical power source, which can be utilized for various operation purposes. Thanks to the use of kinetic energy generated in a standalone manner within the housing of the attached probe, no special design or adjustment device is required for connecting it to the machine tool; the solution complies with any regular support tool.

Further advantages of the provided solution are its convenience and simplicity of use, as well as an almost maintenance-free operation.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
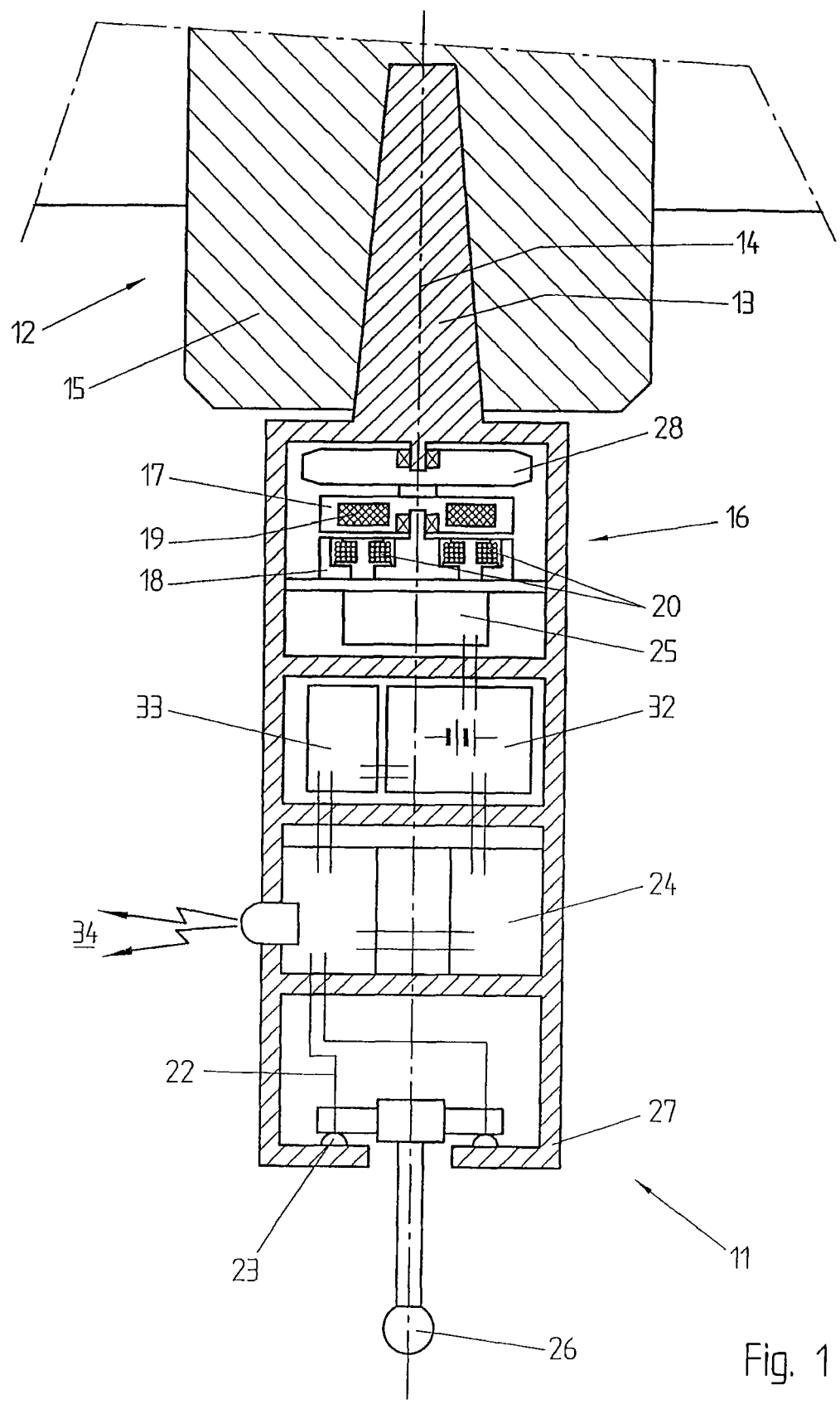
FIG. 1 shows a cut view of a probe according to a preferred embodiment of the invention.

FIG. 1 illustrates a section of a probe 11 according to a preferred embodiment and example of use of the invention. We will assume, for sake of simplicity, that the probe 11 is used in a conventional CNC milling machine 12 having three linear axis XYZ and a rotary spindle 15, though it must be understood that this is not a limitation of the present invention, which can be used in all manners of machine tools 12.

In the represented example the probe 11 is releasably secured to the spindle 15 of the machine tool 12 through a holder comprising a standard taper 13 compatible with the machine tool in use. In the figures the taper is drawn, for simplicity, as integral with the probe. It must be understood, however, that the probe of the invention is not limited to a particular style of connection. The tapered shank will, in general, be part of a detachable tool-holder, to allow interoperability with different machines. The spindle 15 is driven into rotation around the rotating axis 14, defining also the direction in which the probe is removed and introduced to the spindle 15.

The clamping mechanism described above for securing working tools on machine tools 12 is quite widespread; the shank 13 of the probe 11 hence preferably does not need any specific design to interoperate with regular machine tools 12. The fastening system according to the invention allows to move the probe 11 in any position in a three-dimensional measure space, by programming appropriately the XYZ axes of the machine 12, but also to drive the probe 11 in rotation along with the spindle 15 of the machine tool; it will be appreciated that any system for releasably connecting the probe having this rotational driving feature would be suitable for the invention.

At the opposite end of the tapered shank 13, the housing 27 supports a surface sensing and/or measuring device, such as e.g. a touch trigger probe 11, comprising an elongate stylus 26 coupled to a detection circuit 22, preferably coupled itself to a telemetry system unit 24, for transmitting measurement results to a remote control unit (not shown) and/or receiving instructions for the measurement process. In case of a deflection of the probe stylus 26, an electric signal is triggered as soon as an electrical contact 23 of the detection circuit 22 is broken. The invention is not however limited to this particular kind of probe, and can employ also analogue probes and non-contact probes, for example laser probes, generating a measure of coordinates of points on the surface of the workpiece under measure.

The measured coordinates, appropriately encoded, can then be forwarded to the telemetry system unit 24 for wireless data transmission. The data transmission can be performed through optical or radio frequency transmission, for example via infrared, or over a wireless link 34, as illustrated, using e.g. the Bluetooth technology, or any wireless technology used for short distance transmission. Preference will be given to low-power transmission systems. Other wireless data transmission technologies like WLAN could also be foreseen in case a higher bandwidth and/or longer distances are required. Preferably the I/O interface of the telemetry system 24 may be regularly switched off for the sake of power saving, or set to idle by default and ready for transmission only during predefined time slots. Other wireless transmission technologies such as GPRS or EDGE could also be considered; the list of wireless technologies mentioned above is not exhaustive.

The electrical power for the contact detection circuit 22 and/or the telemetry unit 24 is primarily supplied by an electric generator 16. According to a preferred embodiment illustrated on FIG. 1, the rotor 17 of the power generator 16 is located below a driving element 28, which is, according to this embodiment, a flywheel, rotatably connected to the probe. It is provided with sufficient inertia moment to maintain its angular speed independently from the rotation of the probe housing 27. The flywheel 28 can be e.g. an add-on module connectable to the rotating axis of a power generator 16, hence allowing for an improved scalability with existing power generation modules 16.

The rotor 17 carries permanent magnets 19 for providing inducted current in the windings 20 of the stator 18 when there is a relative rotation between stator 18 and rotor 17.

The probe 11 of the invention is mounted on a spindle of a machine tool and, therefore, may be revolving at high speed. In embodiments of the present invention, both stator and rotor may turn at the same time, and in others the stator of the generator may be spinning, while the rotor is at a standstill. The terms "stator" and "rotor", therefore, should not be construed as indicating absolute stillness or absolute rotation in any particular reference frame, but in a relative sense. An example of energy generation cycle will be now described. The spindle 15 of the CNC machine is first actuated, putting the probe housing 27 in rotation. The flywheel 28, due to its high inertia moment, does not follow the motion of the housing 26. If one considers the system in a reference frame fixed to the probe housing, the electric generator 16 "sees" the rotor 17 and the flywheel 28 in relative rotation in a direction opposite.

As long as the spindle keeps on turning, the flywheel, which is preferably mounted on low-friction bearings, would continue spinning (relative to the probe's housing 27) for a quite long time. The permanent magnets 19 of the rotor induce however an electromotive force in the stator's windings 20. If now an electrical current is allowed to circulate in the windings, generating a net positive electric power, an electric braking ensues, the flywheel reaches the angular speed of the housing (in the reference frame fixed to the probe housing), and its kinetic energy is converted into electric energy.

Once the rotation speed of the flywheel 28 has equalled that of the housing, the spindle 15, and with it the probe's casing 27, may be stopped. The flywheel 28 is now seen to spin in the initial rotation direction of the spindle with respect to the stator of the electric generator 16. Once again, the kinetic energy of the flywheel 28 can be converted into electric energy, until the flywheel 28 is again at the angular speed of the housing. The described energy generation cycle can be repeated as many times as necessary.

The described embodiment exploits the inertia of the flywheel 28 to generate electric energy whenever there is an angular the acceleration or deceleration of the spindle, and in transient phases following a sudden change of spindle speed. If the spindle rotates with constant angular speed and the flywheel turns at the same speed, no energy can be produced.

It is possible also, according to another variant, to invert the rotation of the spindle, rather than simply stopping it, thereby doubling the rotation speed of the flywheel relative to the stator. The inversions can be repeated cyclically, to generate energy in a sustained way. For the sake of raising of the inertia moment of the flywheel 28, which means that more kinetic energy can be stored for a given number of revolutions per minute (rpm), the material chosen for the flywheel 28 should be chosen as heavy as possible, e.g. any heavy metal such as iron, platinum, tungsten, lead etc. On the other hand, in order reduce the size of the electric generator 16 and increase its output, the magnets 19 should preferably be rare-earth permanent magnets with a high magnetic energy product, for example samarium-cobalt magnets or NIB (Neodymium-Iron-Boron) magnets.

The power generating unit 16 can supply electric power to any of the electric circuits 22, 24 mentioned above and more generally to any electric or electronic circuit part of a telemetry system unit and/or of an I/O wireless transmission unit 24 of the coordinate probe 11. Power supply occurs whenever the relative rotating speed between the flywheel 28 and the probe housing 27 is not equal to zero, i.e. when the rotor 17 actually rotates with respect to the stator 18. This occurs e.g. when the probe housing 27 is accelerated or decelerated.

Since inertia effects are used to provide the relative rotation of the rotor 17 with respect to the stator 18, as opposed to pneumatic system usually provided in the solutions known in the art, it will be appreciated that no air sealing mechanism is required between the machine tool and the probe. As a result, probes 11 can be more easily and quickly mounted and interchanged.

According to the preferred embodiment illustrated on FIG. 1, the probe 11 further comprises another electrical circuit, such as a voltage converter 25, in order to amplify the voltage produced by the generator 16 and raise it to an acceptable level for the other circuits 22, 24 to work properly. An acceptable level for the electric circuits to work usually amounts around at least 3-4 volts. The voltage converter can be a solid-state voltage multiplier, or any solid state AC/DC converter, which can provide an output voltage higher than the input voltage. As a result, a DC voltage higher than the voltage produced by said electric generator 16 can be generated. The converter 25 is preferably placed between the output of the generator 16 and the input of the telemetry system 24, for which a greater voltage is necessary for the transmission and reception stages. The step of converting an output of the electric generator 16 into a DC voltage, with a higher DC voltage can be performed for whenever necessary and for whichever electric or electronic circuit 22, 24 which may require it.

It is conceivable to have a probe head 11 without any energy storage mechanism. Yet in this case, energy needs to be produced while the measuring operation and/or a data transmission operation is carried out, which is a strong constraint. It is desirable to provide an energy storing unit 32 within the probe 11 in order to store power supplied by the generator 16. The energy-generation cycles need then to be executed only at intervals, and preferably not during actual measurements.

The energy storing unit 32 may serve as a primary energy source for supplying the electric power to the electric circuits 22, 24 within the probe, and be used only when the generator 16 is switched off; it could also be used as an auxiliary energy source or buffer storing a surplus of energy generated by the generator 15 while the generator 16 is operated and/or while the probe 11 is used for measurement purposes. Such a storing unit 32 can hence be used alternatively or in combination with the generator 16, so that a greater flexibility for operation is provided. This allows e.g. to perform measurements for an acceptable measuring time without requiring any rotation of any part of the probe, and more generally to require the actuation of the generator only when it is absolutely necessary.

According to a preferred embodiment of the invention, the energy storing unit 32 stores the produced electrical energy, and is e.g. a rechargeable accumulator or a buffer capacitor. Electrochemical double-layer capacitors (EDLCs) may be used in that purpose due to their superior storing properties.

In order to minimize the maintenance requirements for supplying the probe 11 with electrical energy, it can be foreseen to automate the charging process of the storing means 32, whenever a lack of power is detected. To this end, an energy metering unit 33 can be coupled to the energy storing means 32 in order to indicate the amount of stored energy available at any given time. Preferably this energy metering unit 33 is also coupled to the telemetry system 24 and can trigger the sending of a warning signal to a control unit (not shown) once a minimum power level is reached. Upon reception of such a warning signal, the control unit will set of the machine tool spindle 15 in rotation around the rotation axis 14 in order to switch the generator 16 on, so that enough energy can be supplied and stored in the storing means 32. The steps of driving the rotary axis 14 of the machine tool 12 and transforming kinetic energy into electric energy can be repeated as many times as it is needed to achieve the desired energy level.

Figure 2:
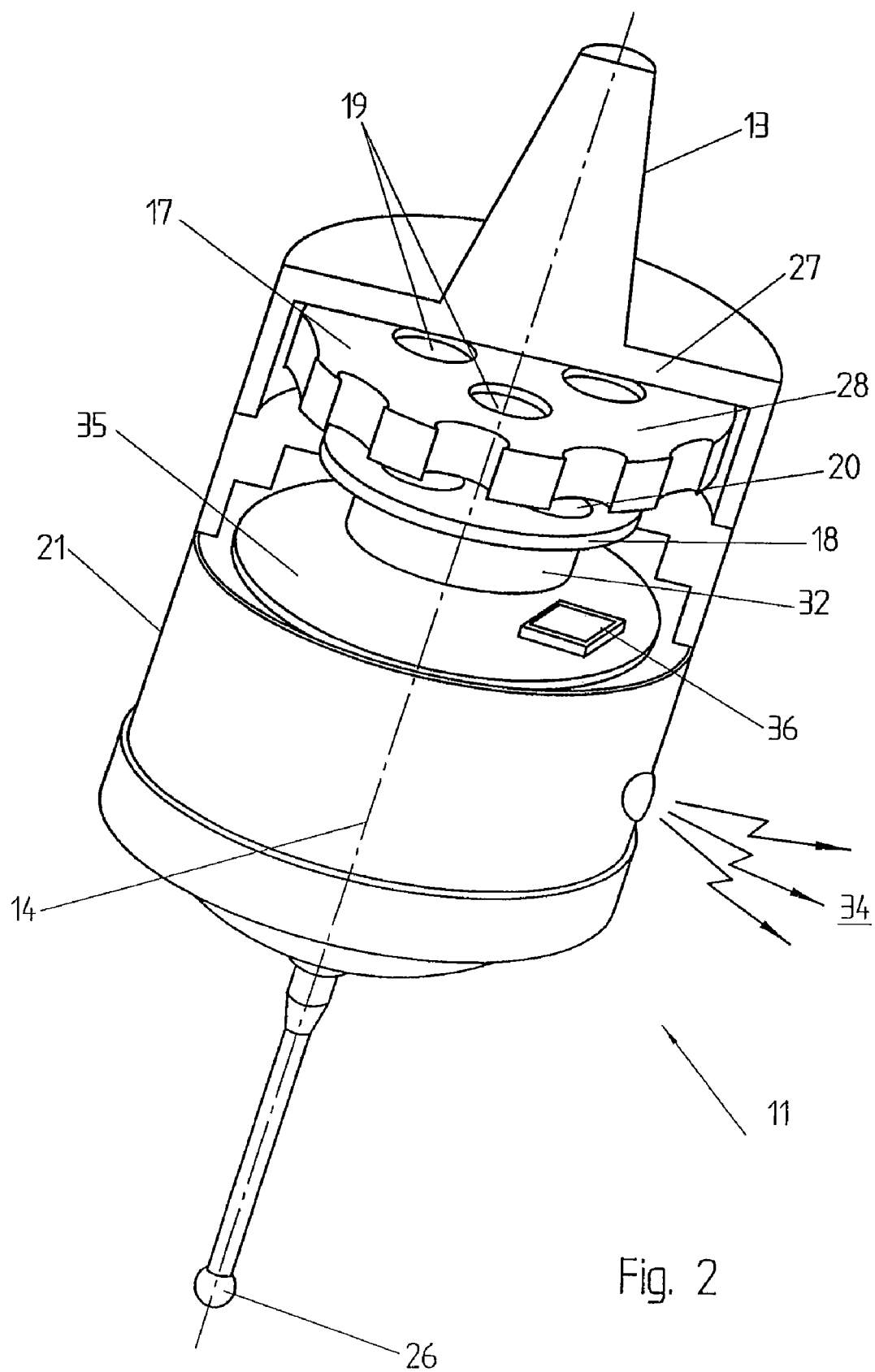
FIG. 2 shows a perspective view of a probe according to a preferred embodiment of the invention.

FIG. 2 shows a perspective view of the probe 11 according to another preferred embodiment, where the inner power generator 16 mechanism is disclosed. The cut in the housing 27 right under the shank 13 allows to see the inertia mass 28, which is here integral with the rotor 17, and holes where the permanent magnets 19 are preferably lodged. Facing the rotor 17, one can distinguish the stator 18 and its embedded windings 20.

Below the stator 18 is mounted a buffer capacitor, or any other type of energy storing unit known in the art 32, for storing the produced electrical energy. The buffer capacitor 32 can be connected to a circuit board 35 on which various electronic components are mounted, including e.g. a CPU 36 and the components of the contact detection circuit 22 as well as the telemetry system unit 24 (not shown). Beside the CPU, the other components are not visible since they are preferably located below the circuit inside the casing 21 which provides the necessary place for lodging them. The wireless transmission part of the telemetry system 24, made up by e.g. an antenna or an infrared port, is preferably mounted on the outer surface of the casing 21 for minimizing signal attenuation effects. It is visible on the side of the casing 21.

The CPU 36 can preferably be used for processing the signal received by the detection circuit 22 whenever the probe stylus 26 is deflected according to its mounting axis. On FIG. 2, this axis corresponds jointly to the rotation axis 14 of the probe 11 and the machine tool 12. The signal can then be routed to the telemetry system unit 24 for transmission to a remote control unit. However, as mentioned earlier already in this document, the CPU 36 can also be used as an interface for both data emission and reception. It could trigger the actuation of the generator 16 of even a measurement program execution for the probe 11 upon analysis of the instructions received over the wireless link 34. A CPU is also preferably coupled to the energy metering unit 33 in the preferred embodiment involving such an element. In that case, the CPU 36 processes the alarm signal sent whenever the charge level is too low, and transmits it over the wireless link 34 to a remote control unit (not shown). A CPU 36 could also be in charge of deciding which operations consuming electrical energy should be run on stored energy and which ones would require real-time electrical power energy provisioning through the generator 16.

Figure 3:
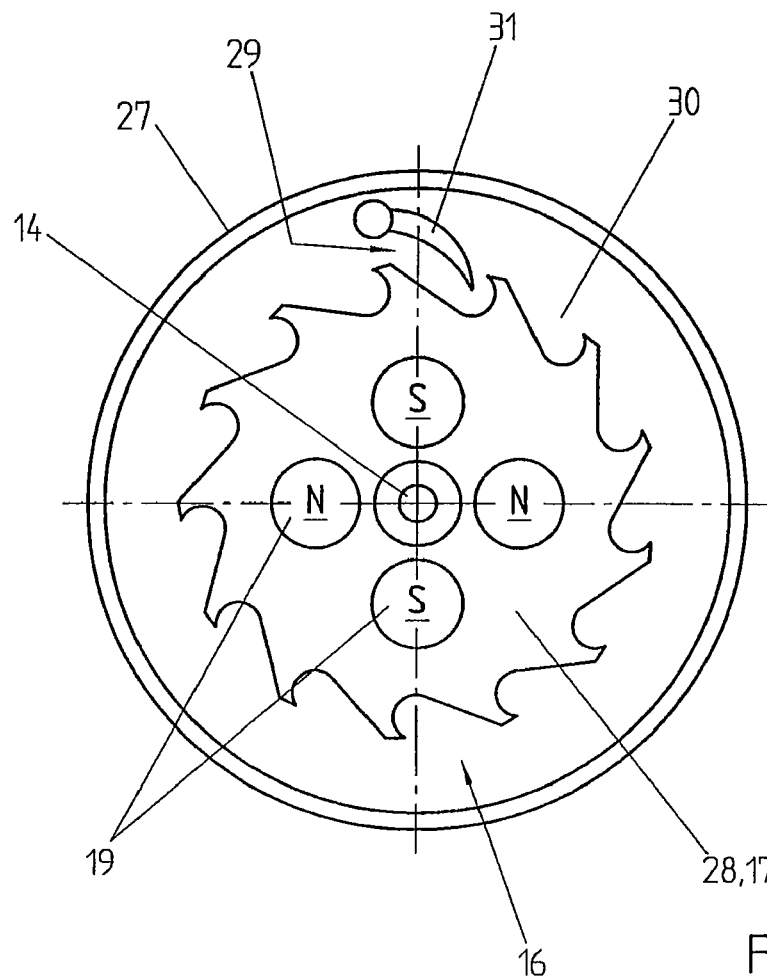
FIG. 3 shows a top view of a power generating unit according to a preferred embodiment of the invention.

FIG. 3 illustrates a top view of a generator 16 comprising a series of magnets 19 embedded on a rotor 17. Each consecutive magnets 19 of the series have an inverted disposition of their poles (N, S standing for North and South poles) so that the inducted flow in the windings 20 is alternated. The generator 16 disclosed comprises a unidirectional clutch 29 for transmitting the rotation of the support element 13 to the flywheel 28 of the rotor 18 in one direction only. The clutch 29 is based, in this example, on the cooperation of corrugated teeth 30 at the periphery of the rotor 18 with the pawl 31 secured to the probe housing 27. It will obviously be appreciated that this embodiment is given by way of example only, and that many other variants of overrunning clutch or freewheel could also be applied in the frame of this invention. The clutch allows driving the flywheel 28 of the rotor 17 at the same speed as the housing 27 when the spindle 15 of the machine tool 12 is driven in the free sense, i.e. clockwise for the embodiment illustrated, and to disengage the flywheel 28 when the machine tool rotary axis 14 is driven in a direction opposite to the first direction. Once the rotation of spindle 15 is switched off, the deceleration of the probe housing 27 is much faster than the one of the rotor 18, which continues spinning around due to its inertia moment, and the flywheel 28 is disengaged. The resulting relative rotation speed of the rotor 17 can be used to produce electric current as above.

The inclusion of the unidirectional clutch 29 shortens the power generation cycles, as the flywheel 28 is instantaneously accelerated at the same number of rpm of the probe. The electric generator 16 needs to be operated in one rotation direction only, which may simplify its construction and the annexed circuitry.

In order to maximize the energy produced by the generator 16, the friction losses in the rotation of the rotor 17 should be kept as low as possible. To that end, roll, needle or ball bearings (not shown) could be foreseen on the axis of the rotor 17, and any appropriate lubricant material applied on both pawl part 31 and teeth parts 30 of the blocking mechanism.

Figure 4:
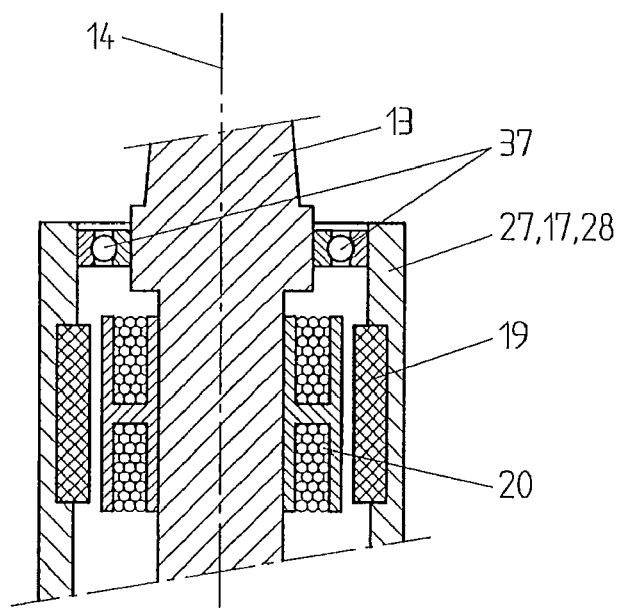
FIG. 4 shows a power generating unit according to an alternative embodiment of the invention.

In the embodiment illustrated by FIG. 3, the rotor 17 is also integrated to a flywheel 28 bearing magnets 19 for inducting current into the windings of the stator. The variant embodiment illustrated on FIG. 4 shows an alternative embodiment in which the flywheel 28 and the housing 27 of the probe are realized in one and same piece, whereby magnets 19 would be fixed or incorporated on the inner surface of the housing 27. The references 17, 27 and 28 are hence merged on the probe housing. In this embodiment, the windings of the stator 18 are preferably be disposed with a minimal gap to provide an adequate inducted current flow with all the circularly distributed coils. Instead of a plurality of magnets 19, a collar including an annular multipolar magnet could also be mounted on the inside of the housing 27.

As it can be seen on FIG. 4, for this embodiment of the invention the support 13 is preferably coupled directly to the stator 18 and drives it in rotation around the axis 14, while bearing joints 37 such as ball bearings allow the housing 27 not to follow the spinning movement.

The design approach disclosed for the probe 11 provides a self-powering mechanism with possibly an almost maintenance-free operation. The probe 11 according to the invention is supposed to work completely self-sufficiently in terms of energy, such that a change of accumulators, which may be used to increase the overall availability of the system, is never required. A maximal flexibility is provided for generating current on demand, i.e. intermittently whenever needed including outside predefined time slots, and also for possibly whichever electrical circuit operation. The energetic efficiency of the self-powering mechanism disclosed is also better than the usual solutions available, since no additional system, e.g. a pneumatic system, is required for provisioning the kinetic energy used for energy transformation.

Figure 5:
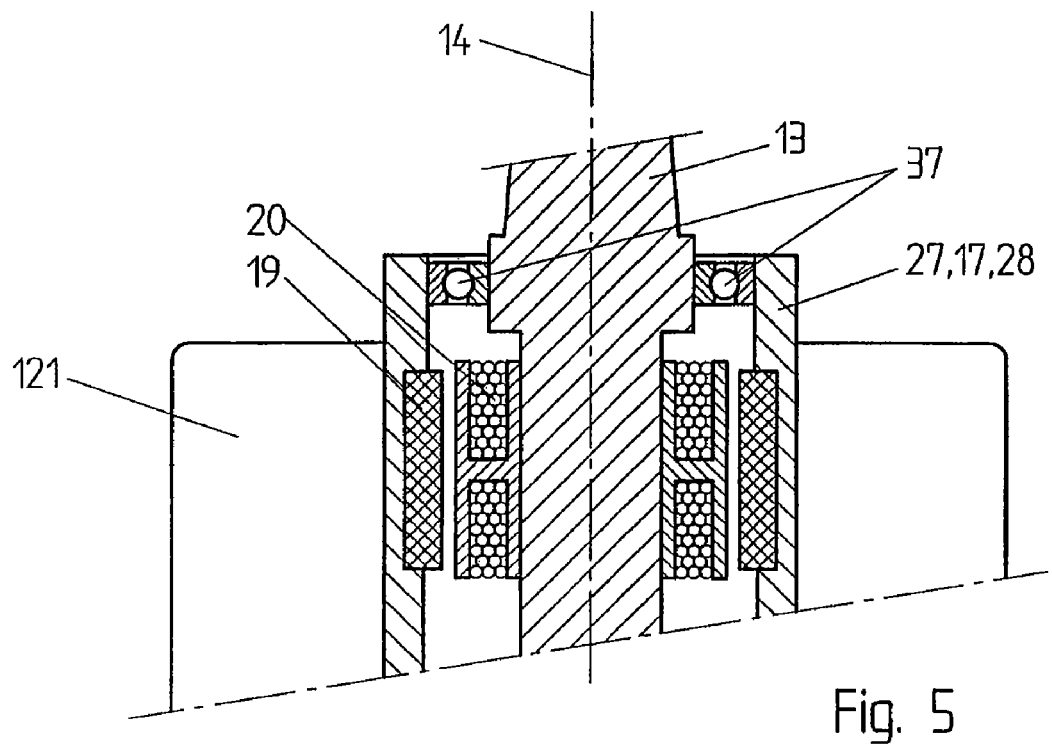
FIGS. 5 and 6 illustrate a further embodiment of the invention.

According to another embodiment of the present invention, illustrated in FIG. 5, the driving element 28 is part of the outer casing of the probe, rotatably connected to the probe body, and provided with projecting vanes 121 that maximise its aerodynamic drag. In this way, when the spindle 13 is put in rotation, the driving element will not spin at the same speed, but at a lower velocity. This difference of angular speed allows the windings 20 to generate electrical energy. It will be perceived that this embodiment relies on the same principle of the previous ones, that is to exploit a differential rotation speed between the driving element and a stator element of the probe, hence between the stator and the rotor of the electric generator; the difference with respect to the previous embodiments lies in that the difference of speed is not induced by inertia, but by an aerodynamic brake composed by the vanes 121. Advantageously, speed difference and electric energy production can be maintained indefinitely or as long as required, while in the previous inertia-based variants, energy production was limited to the acceleration and deceleration phases, and was, as a consequence, necessarily intermittent. The electric power that can be generated in this embodiment is, in the ideal case, equal to the mechanical power dissipated in the aerodynamic brake.

It is clear that the shape and disposition of the vanes in FIG. 5 is provided by way of example only, and that other kinds of aerodynamic brakes could be substituted, without departing from the scope of the invention. In a preferred variant, the vanes could be self-deploying, with a compact configuration, when the spindle does not turn, in which the vanes are folded close to the probe's body, and an extended configuration in which the vanes project from the probe body, as to maximise the drag. The deployment of the vanes could be driven by a centrifugal force, an aerodynamic force, or any other means or combination thereof.

Figure 6:
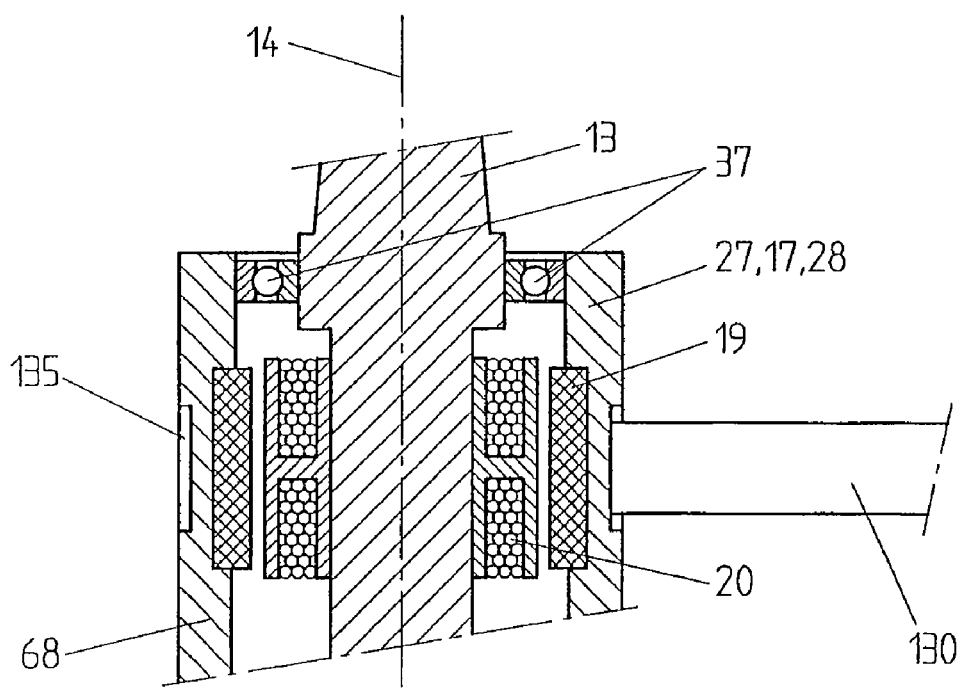

According to a further variant of the invention illustrated in FIG. 6, the driving element 28 is braked when the CNC machine is actuated to bring the probe to a predefined braking location. In the illustrated example the driving element 28 is part of the outer casing of the probe, rotatably connected to the probe body, and a braking element 130, fixed to the machine's table, is brought into contact with the driving element 28, thereby hindering its motion. If, in this position, the spindle is set into rotation, the driving element 28 carrying the magnets will not follow this motion, and electric energy will be produced by the winding 20.

As to the shape and location of braking element 130, it is clear that the present invention encompasses many variants and alternatives thereof, and that finger the shape illustrated on FIG. 6 is given by way of example only. The position of the braking element 130 is also free. In a preferred variant, the braking element 130 would be incorporated in a tool magazine, from which the CNC machine fetches tools and probes automatically.

Many optional features could be added to this variant of the invention, to improve the braking effect in this variant. For example the driving element 28 and/or the stationary finger 130 could have a rubbery surface, or a surface of a material having a high friction coefficient. In addition or alternative, the driving element 28 could have nooks and protrusions, interoperating with the finger 130, as it is schematically indicated on the FIG. 6.

Figure 7:
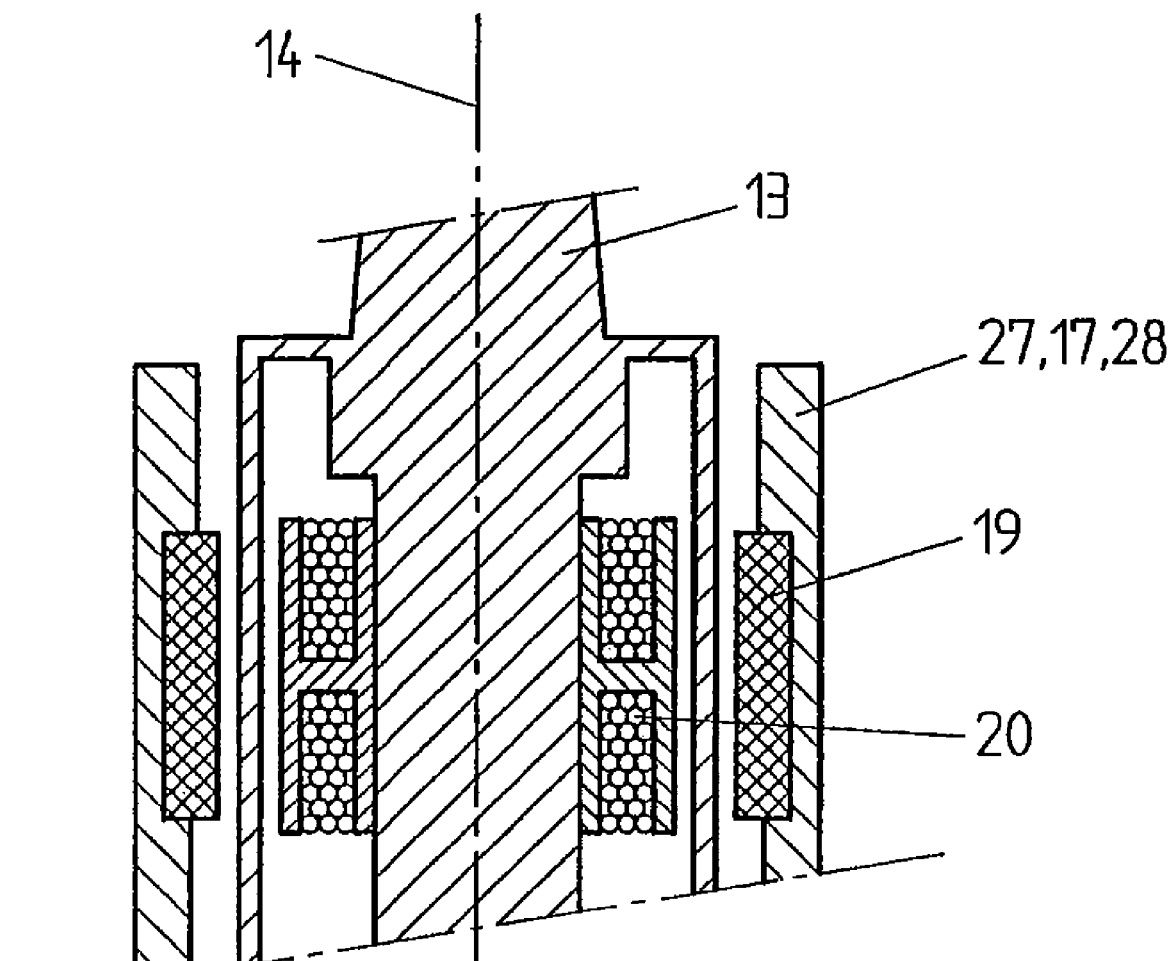
FIG. 7 shows another embodiment of the invention.

According to the embodiment illustrated on FIG. 7, the driving element 28 is not be connected to the probe body, but is at a predetermined fixed position on the machine's reference table, for example in the tool magazine. In this variant, the probe is equipped with the windings 20, and the driving element 68 carries a number of permanent magnets 19. To produce electric energy, the CNC machine is driven to insert the probe into the driving element, or at least in a magnetic relationship with the driving element, and then the spindle is set into rotation for a sufficient time to store the desired amount of energy in the accumulators. This advantageous embodiment gives lighter probes.

The positioning accuracy of the CNC or coordinate machine, on which the probe is mounted, will be sufficient in general, to ensure a correct insertion of the probe inside the driving element 68, and a free rotation without any contact between these two elements. The insertion of the probe into the driving element should be carefully programmed to avoid unwanted contacts.

To make insertion of the probe even easier, it may be advantageous to provide the driving element with one or more rotatable elements, onto which the probe may seat. In this case, the driving element shall preferably include an elastic mount, to compensate for any misalignment of the probe. As it was the case for the embodiment of FIG. 6, the driving element may advantageously be integrated in a tool magazine or in a lodging of a tools-holder. This advantageous configuration permit to generate the power needed at the beginning of the measuring operations.

Various embodiments of the present invention, relate to a probe, connectable to a machine tool, having an electric generator 16, supplying an electric or electronic circuit 22 with electric power, and a driving element 28, capable of relative rotation with respect to the stator of the electric generator. The rotation axis of the driving element is preferably a symmetry axis of the probe itself. The driving element is not connected to any external energy source, and can be set in rotation simply by activating the rotary axis of the machine tool.

Advantageously, the driving element of the present invention is not directly connected with any mobile element of the machine tool, but is either rotatably mounted on the probe itself, or fixed on the reference table of the machine tool. Importantly, the inventive probe requires no additional connections to the machine tool on which it is mounted, besides the connection to the rotary spindle, which can be realized with a conventional tool-holder with a standardised tapered shank. In this way the inventive probe is fully compatible with standard probes, and can be mounted and used with standard tool-holders, without any adaptation. The self-powering function of the probe can be activated simply by sending appropriate rotation instructions to the machine tool's spindle.

According to the different embodiments of the invention, relative rotation of the driving element is obtained by a dissipative braking of the driving element. In other variant, the relative rotation of driving element is simply issue from a fixed position on the machine table or from a holding device like a tool-holder or a tool magazine.

According to the various variants and embodiments of the invention, energy can be generated at any position, or only when the probe is moved to same special position in relationship with a braking device or with the driving element.

REFERENCES' LIST

11 Probe
12 Machine tool
13 Support element (tapered shank)
14 Rotating axis of the machine tool
15 Spindle of the machine tool
16 Power generating unit
17 Rotor of the generator
18 Stator of the generator
19 Magnets
20 Windings
21 Casing for electrical circuits
22 Contact detection circuit
23 Electrical contacts
24 Telemetry system unit
25 Voltage converter circuit
26 Probe stylus
27 Probe housing
28 Flywheel, Driving element
29 Unidirectional blocking apparatus
30 Corrugated teeth
31 Pawl
32 Energy storing unit
33 Energy metering unit
34 Wireless transmission link
35 Circuit Board
36 CPU
37 Bearing joint
121 Aerodynamic braking vane
130 Braking finger
135 Nook

The invention claimed is:

1. A coordinate probe for a machine tool, comprising:
a support element, connectable to a rotary axis of the machine tool;
a coordinate sensor for measuring coordinates of points on a surface of a workpiece, the coordinate sensor using an electric or electronic circuit;
an electric generator, supplying said electric or electronic circuit with electric power;
a driving element, at least partially free to turn about an axis relative to a stator of the electric generator, said electric generator being operatively arranged to generate electric energy from the relative difference of angular speed between said driving element and said stator; and
a unidirectional clutch transmitting rotation of the support element to the driving element when said machine tool rotary axis is driven in a first direction, and disengaging the driving element when the machine tool rotary axis is driven in a direction opposite to the first direction.

2. The coordinate probe of claim 1, wherein said stator includes a winding.

3. The coordinate probe of claim 1, wherein the driving element is so arranged that it can be set in rotation relative to the stator of the electric generator by activating the rotary axis of the machine tool.

4. The coordinate probe of claim 1, wherein the coordinate probe requires no additional connection to the machine tool except the connection to the rotary axis of the machine tool, to generate electricity.

5. The coordinate probe of claim 1, wherein the driving element is a flywheel, rotatably connected to the coordinate probe.

6. The coordinate probe of claim 5, wherein the flywheel is integral to the rotor of electric generator and carries permanent magnets or rare-earth magnets or Neodymium-Iron-Boron magnets.

7. The coordinate probe of claim 5, wherein the flywheel is a housing of the probe.

8. The coordinate probe of claim 1, wherein the coordinate sensor is a touch stylus probe, and the electric or electronic circuit is a contact detection circuit of the stylus with the workpiece.

9. The coordinate probe of claim 1, wherein the electric or electronic circuit is part of a telemetry system unit or part of an I/O wireless transmission unit of the coordinate probe.

10. The coordinate probe of claim 1, further comprising energy storing means for storing the electric power supplied by the power generating unit.

11. The coordinate probe of claim 10, further comprising an energy meter unit coupled to said energy storing means.

12. The coordinate probe of claim 1, further comprising an AC/DC voltage converter circuit to generate a DC voltage higher than the voltage produced by said electric generator.

13. The coordinate probe of claim 1, wherein the driving element includes an aerodynamic brake.

14. The coordinate probe of claim 1, wherein the driving element is placeable at a fixed position on a reference frame of the machine tool.

15. The coordinate probe of claim 1, wherein the driving element is drivable by the support element, said support element acting on the driving element at a fixed position.

16. A method for generating power with a coordinate probe releasably connectable to a machine tool, the method comprising:
connecting a support element of said probe to a rotary axis of the machine tool;
driving in rotation the rotary axis of the machine tool, thereby inducing relative rotation of a driving element included in the coordinate probe with respect to a driving element of an electric generator included in the coordinate probe;
transforming kinetic energy of the driving element included in the coordinate probe into electric energy by the electric generator; and
measuring energy stored in an energy storage unit of the coordinate probe, wherein the steps of driving the rotary axis of the machine tool and transforming kinetic energy into electric energy are repeated until the energy stored reaches a minimum set level.

17. The method of claim 16, further comprising accelerating or decelerating the rotary axis of the machine tool, wherein the electric generator generates electric energy whenever relative rotating speed between the driving element of the electric generator included in the coordinate probe and the driving element included in the coordinate probe is not equal to zero.

18. The method of claim 16, wherein power can be generated on demand.

19. The method of claim 16, further comprising converting an output of the electric generator into a DC voltage, wherein the DC voltage is higher than the voltage present at the output of the electric generator.

20. A method for generating power with a coordinate probe releasably connectable to a machine tool, the method comprising:
connecting a support element of the probe to a rotary axis of the machine tool;
driving in rotation the rotary axis of the machine tool, thereby inducing relative rotation of a driving element included in the coordinate probe with respect to a driving element of an electric generator included in the coordinate probe;
transforming kinetic energy of the driving element included in the coordinate probe into electric energy by the electric generator; and
operating the machine tool to bring the probe to a predefined braking location.

21. A method for generating power with a coordinate probe releasably connectable to a machine tool, the method comprising:
connecting a support element of the probe to a rotary axis of the machine tool;
driving in rotation the rotary axis of the machine tool, thereby inducing relative rotation of a driving element included in the coordinate probe with respect to a driving element of an electric generator included in the coordinate probe, wherein the driving element included in the coordinate probe is not connected to the body of the coordinate probe;
transforming kinetic energy of the driving element included in the coordinate probe into electric energy by the electric generator; and
operating the machine tool to bring the probe to a predefined location in a magnetic relationship with the driving element.

22. A method for generating power with a coordinate probe releasably connectable to a machine tool, the method comprising:
connecting a support element of the probe to a rotary axis of the machine tool;
driving in rotation the rotary axis of the machine tool, thereby inducing relative rotation of a driving element included in the coordinate probe with respect to a driving element of an electric generator included in the coordinate probe;
transforming kinetic energy of the driving element included in the coordinate probe into electric energy by the electric generator; and
inverting rotation of the rotary axis of the machine tool.

23. The method of claim 22, further comprising repeating the step of inverting rotation of the rotary axis of the machine tool cylindrically to generate electricity.

* * * * *